[12] United States Patent  
Mann et al.

(10) Patent No.: US 7,398,590 B1  
(45) Date of Patent: Jul. 15, 2008

(54) APPLYING MECHANICAL SHOCK TO A DATA STORAGE DEVICE WITH AN ENCLOSED LOW-DENSITY GAS

(75) Inventors: Kimberly C. Mann, Worcester, MA (US); Randall T. Lyons, Warren, MA (US); Thomas G. Andrikowich, Whitinsville, MA (US)

(73) Assignee: Maxtor Corporation, Scotts Valley, CA (US)

( * ) Notice: Subject to any disclaimer, the term of this patent is extended or adjusted under 35 U.S.C. 154(b) by 318 days.

(21) Appl. No.: 10/860,626

(22) Filed: Jun. 2, 2004

(51) Int. Cl.  
*G11B 5/127* (2006.01)  
*G11B 27/36* (2006.01)

(52) U.S. Cl. .............. 29/603.03; 29/603.1; 29/603.09; 29/603.12; 360/31

(58) Field of Classification Search .............. 29/603.03, 29/603.09, 603.01, 603.12; 360/31, 53, 97.02, 360/135, 97.01, 77.04, 77.09, 77.02; 277/641, 277/910; 73/156, 152.26, 152.51, 40.7, 49.3, 73/45.5, 52; 361/685, 728, 638, 727  
See application file for complete search history.

(56) References Cited

U.S. PATENT DOCUMENTS

| | | | | |
|---|---|---|---|---|
| 5,282,100 | A |  | 1/1994 | Tacklind et al. .......... 360/97.02 |
| 5,369,983 | A | * | 12/1994 | Grenfell ..................... 73/40.7 |
| 5,454,157 | A |  | 10/1995 | Ananth et al. .................. 29/603 |
| 5,666,243 | A |  | 9/1997 | Brent .......................... 360/106 |
| 5,784,296 | A |  | 7/1998 | Baker et al. ............. 364/551.01 |
| 5,793,559 | A | * | 8/1998 | Shepherd et al. ......... 360/78.09 |
| 5,909,337 | A | * | 6/1999 | Tyndall, III .............. 360/97.01 |
| 5,939,619 | A | * | 8/1999 | Achter et al. ................. 73/40.7 |
| 6,050,133 | A | * | 4/2000 | Achter et al. ................. 73/40.7 |
| 6,144,178 | A | * | 11/2000 | Hirano et al. ............... 318/476 |

| | | | |
|---|---|---|---|
| 6,178,059 | B1 | 1/2001 | Frees .......................... 360/75 |

(Continued)

FOREIGN PATENT DOCUMENTS

WO WO 2004/010419 A1 1/2004

(Continued)

OTHER PUBLICATIONS

U.S. Appl. No. 10/055,237, filed Oct. 24, 2001, Marshall et al.

(Continued)

*Primary Examiner*—A. Dexter Tugbang  
*Assistant Examiner*—Tai Nguyen  
(74) *Attorney, Agent, or Firm*—Fellers, Snider, et al.

(57) ABSTRACT

The present invention relates to a method of manufacturing low-density gas-filled disk drives involving test equipment utilized to determine gas leaks occurring in disk drives subjected to shock and vibration events. A disk drive is placed in a sealed container, which, in turn, is connected to a gas detection device. Following shock or vibration testing, the gas detection device determines if a leak has occurred, as well as the quality of gas leaked from the disk drive. The present invention also involves a test apparatus designed to check the accuracy and calibration of associated gas detection devices used during the shock and vibration tests. The test apparatus utilizes a sealed test chamber containing a known quantity of gas, which is released during a test event. Knowing the quantity of gas released, the output of the gas detection device can be monitored and calibrated as needed.

20 Claims, 10 Drawing Sheets

U.S. PATENT DOCUMENTS

| | | | |
|---|---|---|---|
| 6,222,375 B1 | 4/2001 | Fitzpatrick et al. | 324/601 |
| 6,317,286 B1 | 11/2001 | Murphy et al. | |
| 6,392,838 B1 | 5/2002 | Hearn et al. | 360/97.02 |
| 6,496,362 B2 * | 12/2002 | Osterhout et al. | 361/685 |
| 6,560,064 B1 * | 5/2003 | Hirano | 360/97.02 |
| 6,567,235 B2 * | 5/2003 | Kasetty et al. | 360/97.01 |
| 6,618,221 B2 * | 9/2003 | Gillis et al. | 360/97.02 |
| 6,631,053 B1 | 10/2003 | Chew | 360/265.7 |
| 6,644,362 B2 | 11/2003 | Bernett | |
| 6,646,821 B2 * | 11/2003 | Bernett et al. | 360/31 |
| 6,678,102 B1 | 1/2004 | Liikanen et al. | 360/31 |
| 6,683,747 B2 | 1/2004 | Bernett | |
| 6,762,909 B2 | 7/2004 | Albrecht et al. | |
| 6,785,082 B2 | 8/2004 | Fiorvanti et al. | |
| 6,785,089 B2 | 8/2004 | Bernett | |
| 6,876,515 B2 | 4/2005 | Unno | |
| 6,898,043 B2 | 5/2005 | Fioravanti | |
| 6,914,742 B1 | 7/2005 | Fioravanti et al. | |
| 6,930,858 B2 | 8/2005 | Gunderson et al. | |
| 6,970,322 B2 | 11/2005 | Bernett | |
| 6,989,493 B2 | 1/2006 | Hipwell, Jr. et al. | |
| 6,999,262 B2 | 2/2006 | Han et al. | |
| 2003/0007280 A1 | 1/2003 | Bernett et al. | 360/77.02 |
| 2003/0026033 A1 | 2/2003 | Fioravanti et al. | 360/75 |
| 2003/0081349 A1 | 5/2003 | Bernett | 360/97.02 |
| 2003/0089417 A1 | 5/2003 | Bernett | 141/65 |
| 2003/0090832 A1 | 5/2003 | Bernett et al. | 360/97.02 |
| 2003/0172520 A1 | 9/2003 | Liu et al. | |
| 2003/0179489 A1 | 9/2003 | Bernett et al. | 360/97.01 |
| 2003/0202276 A1 | 10/2003 | Smith | 360/97.02 |
| 2004/0216514 A1 | 11/2004 | Nunnally et al. | |
| 2005/0068666 A1 | 3/2005 | Albrecht et al. | |
| 2005/0173870 A1 | 8/2005 | Gunderson | |
| 2005/0184463 A1 | 8/2005 | Boutaghou et al. | |
| 2006/0002067 A1 | 1/2006 | Gunderson et al. | |
| 2006/0044666 A1 | 3/2006 | Fukushima | |
| 2006/0044675 A1 | 3/2006 | Fukushima et al. | |
| 2006/0072241 A1 | 4/2006 | Feliss et al. | |
| 2006/0072244 A1 | 4/2006 | Rapp | |

FOREIGN PATENT DOCUMENTS

WO    WO 2004/010431 A1    1/2004

OTHER PUBLICATIONS

U.S. Appl. No. 10/266,436, filed Oct. 8, 2002.
U.S. Appl. No. 10/839,608, filed May 4, 2004, deJesus et al.
U.S. Appl. No. 10/848,476, filed May 17, 2004, Burns et al.
U.S. Appl. No. 10/839,611, filed May 4, 2004, Gifford et al.
U.S. Appl. No. 10/839,548, filed May 4, 2004, Andrikowich et al.
U.S. Appl. No. 10/839,606, filed May 4, 2004, Andrikowich et al.
U.S. Appl. No. 10/839,685, filed May 4, 2004, Andrikowich et al.
IBM Corp., "Seal for a Hermetically Sealed Disk File," IBM Technical Disclosure Bulletin, vol. 27, No. 11 (Apr. 1985).

* cited by examiner

APPLYING MECHANICAL SHOCK TO A DATA STORAGE DEVICE WITH AN ENCLOSED LOW-DENSITY GAS

FIELD OF THE INVENTION

The present invention relates to hard disk drives having a low-density gas internal environment for improved performance and, more specifically, to methods and apparatus for testing the integrity of seals used to maintain the low-density gas environment.

BACKGROUND OF THE INVENTION

Hard disk drives incorporate magnetic storage disks and read/write heads, which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly, which positions the heads relative to the surface of the storage disks. This may be at a predetermined height above the corresponding storage disk or, in some instances, in contact with the surface of the storage disk. The actuator assembly is typically positioned by a voice coil motor, which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely affect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations, further increasing TMR. High rotational speeds can also increase spindle motor power and idle acoustics.

Accuracy can be further adversely affected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals or gaskets used in disk drives between the housing components, such as between the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low-density gas or a lower density gas means a gas having a density less than that of air. When compared with air, lower density gases can reduce aerodynamic drag experienced by spinning disks within the drive, thereby reducing power requirements for the spindle motor. A low-density gas-filled drive thus uses less power than a comparable disk drive that operates in an air environment. Relatedly, the reduction in drag forces within the low-density gas-filled drive reduces the amount of aerodynamic turbulence that is experienced by drive components such as the actuator arms, suspensions and read/write heads. Some low density gases also have greater thermal conductivity, which results in better motor efficiencies and therefore lower power consumption for a given performance level. Reduction in turbulence allows drives filled with low-density gas to operate at higher speeds compared with air-filled drives, while maintaining the same flying height and thereby maintaining the same range of read/write errors. Low-density gas-filled drives also allow for higher storage capacities through higher recording densities due to the fact that there is less turbulence within the drive which allows the tracks to be spaced more closely together.

Despite these advantages, low-density gas-filled drives have not been commercially successful. Low-density gas-filled drives, in order to function, must be effectively sealed over an acceptable lifetime of the drive. It has been difficult to prevent the low-density gas from escaping from the sealed drive environment. Unlike air-filled drives, a port may not be used to equalize pressure outside and inside the drive. As a result, the seal between the cover and base plate and the seal used to close any opening in the cover or base plate must minimize or prevent leakage and maintain a threshold level of low-density gas within the sealed environment over the expected lifetime of the drive.

Conventional rubber seals in air-filled drives are inadequate at preventing leakage of low-density gas due to the smaller atom size of low-density gases, such as helium, compared to air. The smaller helium atoms diffuse through the rubber seals, thereby reducing the volume of low-density gas within the drive. Thus, over time, the necessary threshold quantity of low-density gas may be lost within the drive environment and may or may not be replaced with ambient air. In either case, the performance of the drive will change from the design specifications, namely, a low-density gas-filed sealed environment. As the low-density gas leaks out of a drive and is replaced by air, the drive is subject to undesirable operational effects possibly leading to failure of the drive. For example, the increased concentration of air may increase the turbulent forces on the heads due to the increased drag forces within the drive which may further cause the heads to fly at too great a distance above the disks and potentially increasing instances of read/write errors. If the low-density gas leaks from the sealed environment over time and is not replaced by ambient air, problems will occur such as the heads flying at a distance too close or in contact with the disks, thereby increasing instances of read/write errors as well as damage to the disk surface and head, and higher operating temperatures due to a reduction in conduction cooling. Each creates a reliability risk. The risk of unanticipated failures due to inadequate amounts of low-density gas within the drive is a drawback to low-density gas-filled drives. Indeed, data stored within the drive may be irretrievably lost if the drive fails due to the loss of the low-density gas environment.

Low-density gas-filled drives also must be designed to permit testing and rework, if necessary. Thus, the ability to seal openings in the base plate and/or cover plate on a temporary basis and on a long-term basis must exist. Such openings include, but are not limited to, openings for securing ends of the spindle and actuator shafts to the cover or base plate, or openings to permit self-servo writing. These openings must be adequately sealed to permit testing of the drive under normal conditions and, if possible, unsealed to permit rework. Thus, it is desirable to minimize waste and optimize efficiencies when sealing a disk drive housing to allow rework when needed.

SUMMARY OF THE INVENTION

Embodiments of the present invention are generally directed to applying mechanical shock to a data storage device with an enclosed low-density gas.

In accordance with some embodiments, a method generally comprises providing a data storage device comprising a housing filled with a low-density gas, placing the data storage device in a test chamber, subjecting the test chamber and the data storage device to a mechanical shock by vibrating the test chamber and the data storage device, and detecting for a presence of said low-density gas within the test chamber in response to the vibrating step.

In accordance with other embodiments, a method generally comprises placing a data storage device filled with a low-density gas in a test chamber substantially void of the low-density gas, subjecting the test chamber and the data storage device to a mechanical shock by vibrating the test chamber and the data storage device, and detecting for presence of the low-density gas within the test chamber in response to the vibrating step.

DETAILED DESCRIPTION

Figure 1:
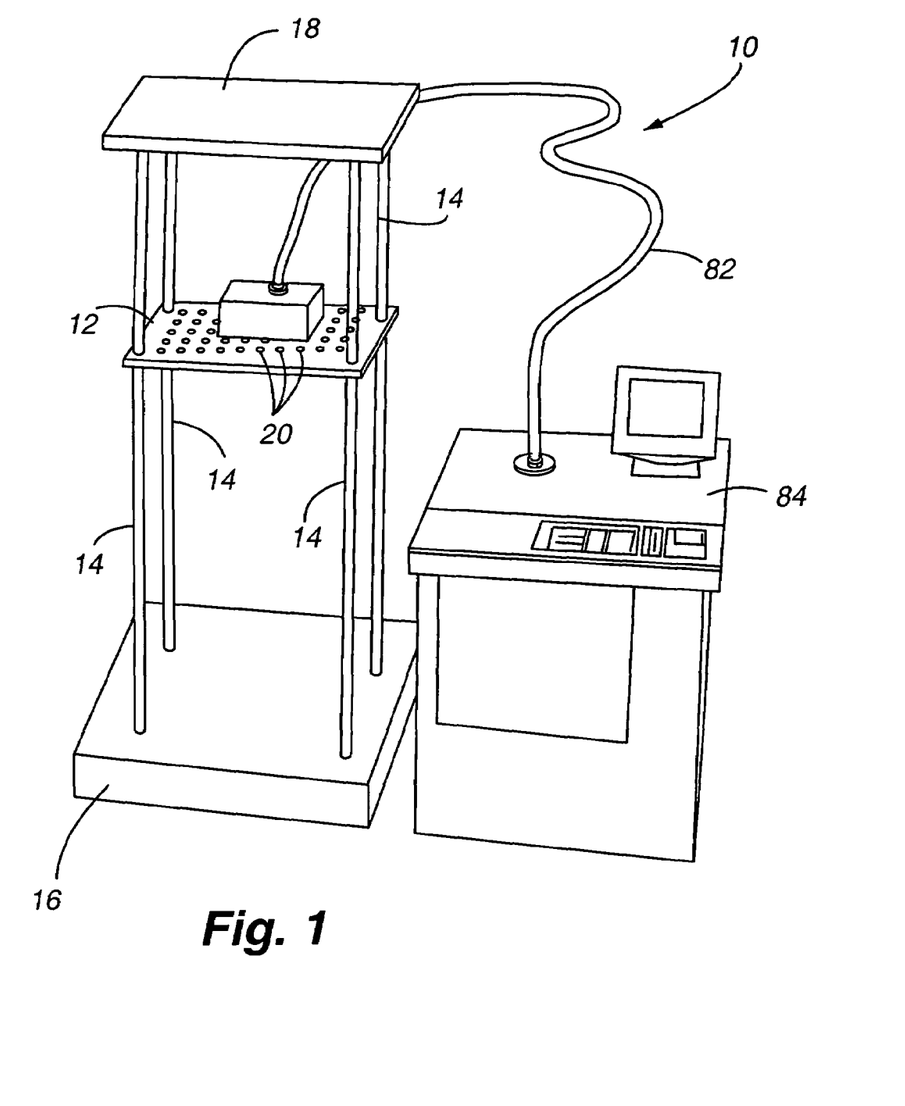
FIG. 1 is an isometric view of one embodiment of the present invention, used to shock test a disk drive filled with low-density gas and to determine the quantity, if any, of such gas leaked from the drive due to the imparted shock.
Figure 2:
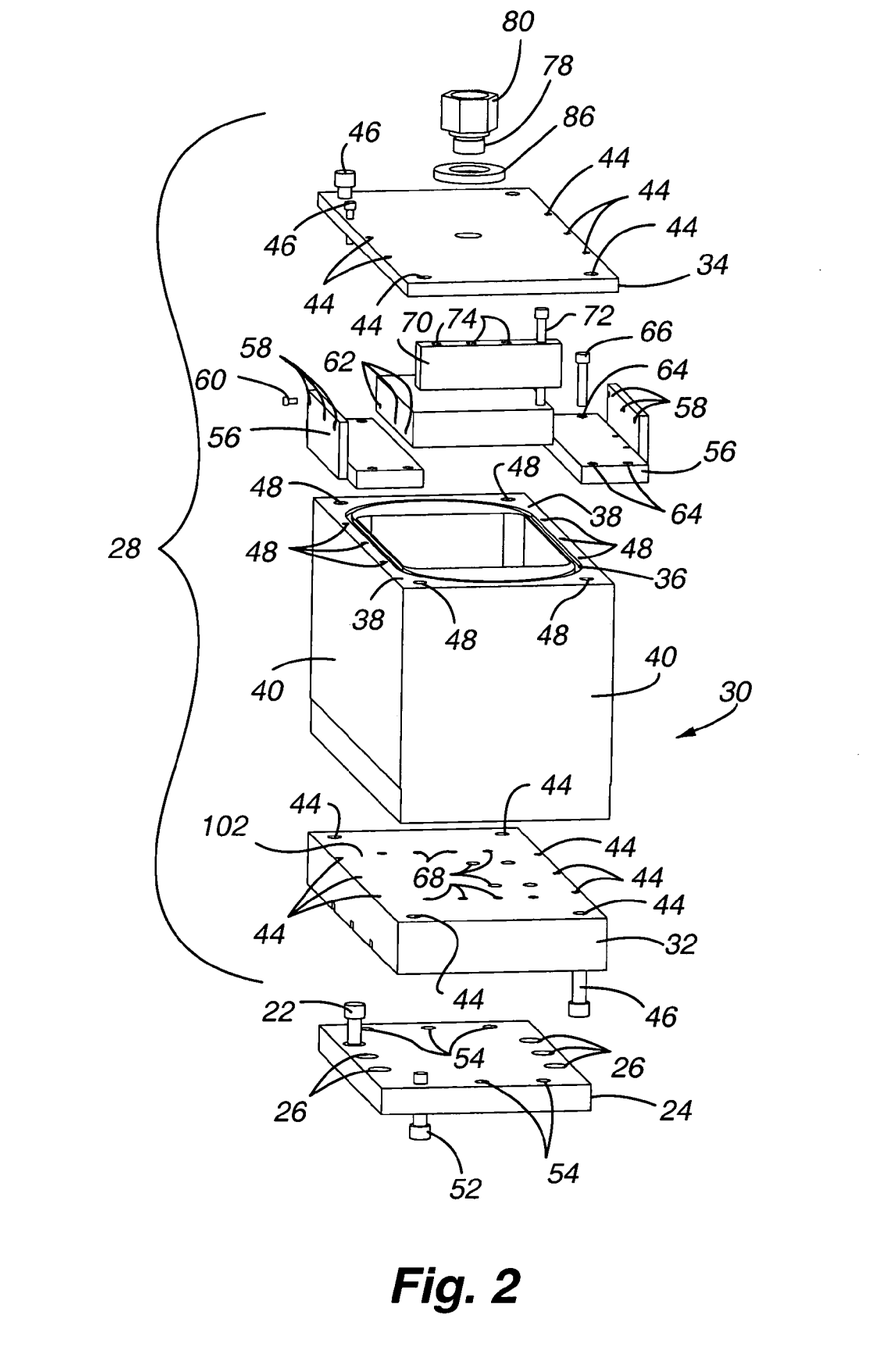
FIG. 2 is an exploded isometric view of a test chamber used to determine gas quantity leaked from a disk drive during a shock or vibration test.

Turning to FIGS. 1-2, an apparatus 10 is shown for testing and measuring seal integrity in a low-density gas-filled disk drive subjected to a vertical or drop shock. The apparatus generally comprises a mounting plate 12 slidably oriented on vertical rails 14. The mounting plate maintains a horizontal orientation and alignment as a result of its connection to the rails. The rails 14 are affixed to a base 16 and top member 18, which orients the rails vertically. The mounting plate 12 has a series of threaded apertures 20 to securely receive fasteners 22, shown in FIG. 2. The fasteners 22 are used to secure a mounting bracket 24 to the mounting plate 12. The mounting bracket has apertures 26 through which the fasteners extend to engage the threaded apertures 20. The mounting bracket 24 interconnects a test chamber 28 to the moveable mounting plate 12. The mounting bracket 24 and test chamber 28 are shown in FIG. 2.

As seen more specifically in FIGS. 2-5, the test chamber 28 comprises a main body portion 30, a base plate 32 and a cover plate 34. In the preferred embodiment, the main body portion is a four-walled open cube structure with a circumferential channel 36 formed in the upper and lower surfaces 38 of the walls 40. The channel 36 receives an O-ring 42 (FIG. 3), which creates a hermetic seal between the walls 40, base plate 32 and cover plate 34. Apertures 44 are formed in the corners and long sides of the base plate 32 and cover plate 34 to allow fasteners 46 to secure the base plate and cover plate to threaded apertures 48 formed in the corners and longs sides of upper and lower surfaces 38 of the walls 40. The base plate 32 also includes threaded apertures 50 to receive fasteners 52 that extend through apertures 54 in the mounting bracket 24 to interconnect the mounting bracket 24 and base plate 32.

A pair of opposed disk drive mounting brackets 56 are also shown in FIGS. 2-5. The opposed disk drive mounting brackets interconnect a disk drive D to the base plate 32 of the test chamber, either directly, or via a fourth disk drive mounting bracket 94. The brackets 56 include apertures 58 that permit fasteners 60 to secure the disk drive D to the brackets 56 using pre-existing threaded apertures 62 in the body of the disk drive. The brackets 56 also include apertures 64 to permit fasteners 66 to mount the brackets 56 to the threaded apertures 68 in the base plate 32, or to the threaded apertures 100 in the fourth disk drive mounting bracket 94. A third disk drive mounting bracket 70 is also provided to provide inverted mounting of the disk drive D relative to the base plate 32 via mounting brackets 56. The apertures 64 in mounting brackets 56 align with apertures 74 in the third disk drive mounting bracket 70, which are aligned with threaded apertures 68 in the baseplate 32, all of which are secured to the base plate 32 by fasteners 72.

The cover plate 32 also includes a centrally disposed aperture 76. The aperture 76 is threaded to receive the threaded male end 78 of coupling 80. The coupling is designed to hermetically connect to a flexible hose 82, the opposite end of which is attached to a gas detection apparatus 84 (see, FIG. 1). A washer 86 and an O-ring 88 are positioned between the cover plate 34 and coupling 80 to create a hermetic seal. The coupling 80 has a central passageway 90, which directly communicates with the interior 92 of the test chamber 28 when the coupling is attached to the cover 34. In turn, the flexible hose 82 provides fluid communication between the coupling 80 and gas detection device 84. In the preferred embodiment, a flexible metal outer sheath surrounds and protects the flexible hose 82.

Figure 3:
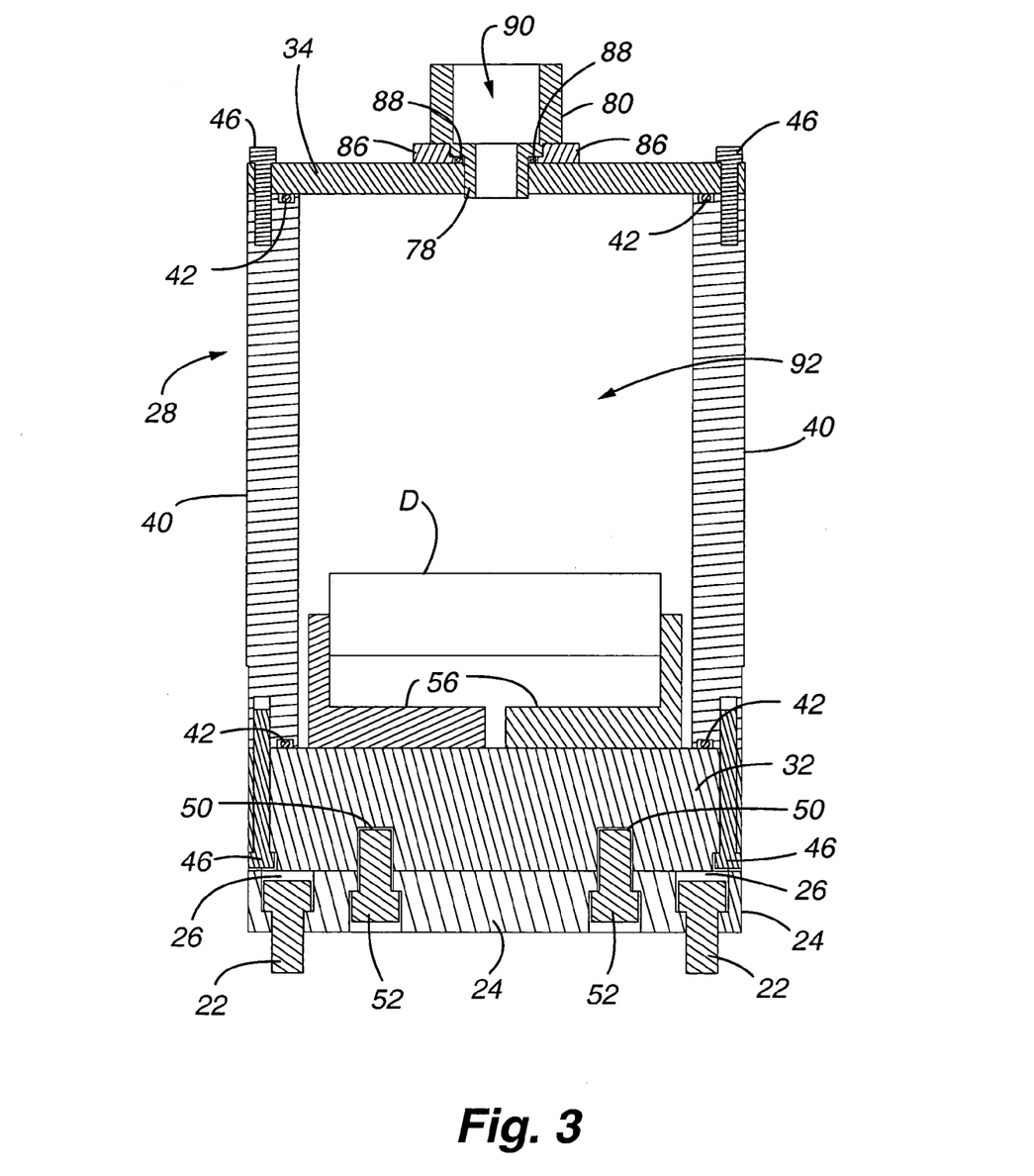
FIG. 3 is a cross-section of the device shown in FIG. 2, further showing a low density gas-filled disk drive mounted horizontally within the test device.
Figure 4:
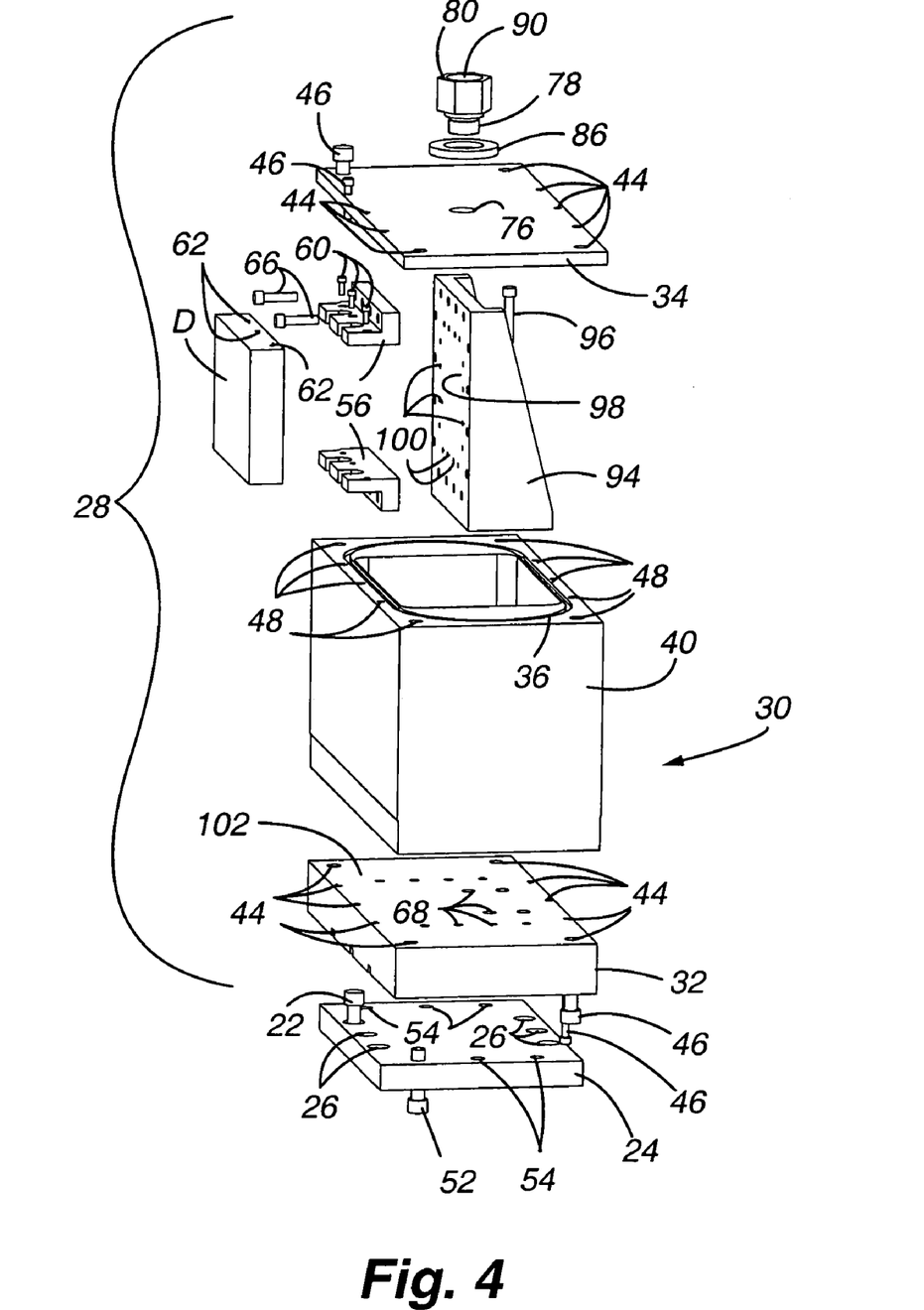
FIG. 4 is an exploded isometric view of the test chamber of FIG. 2, showing the low density gas-filled drive oriented vertically.
Figure 5:
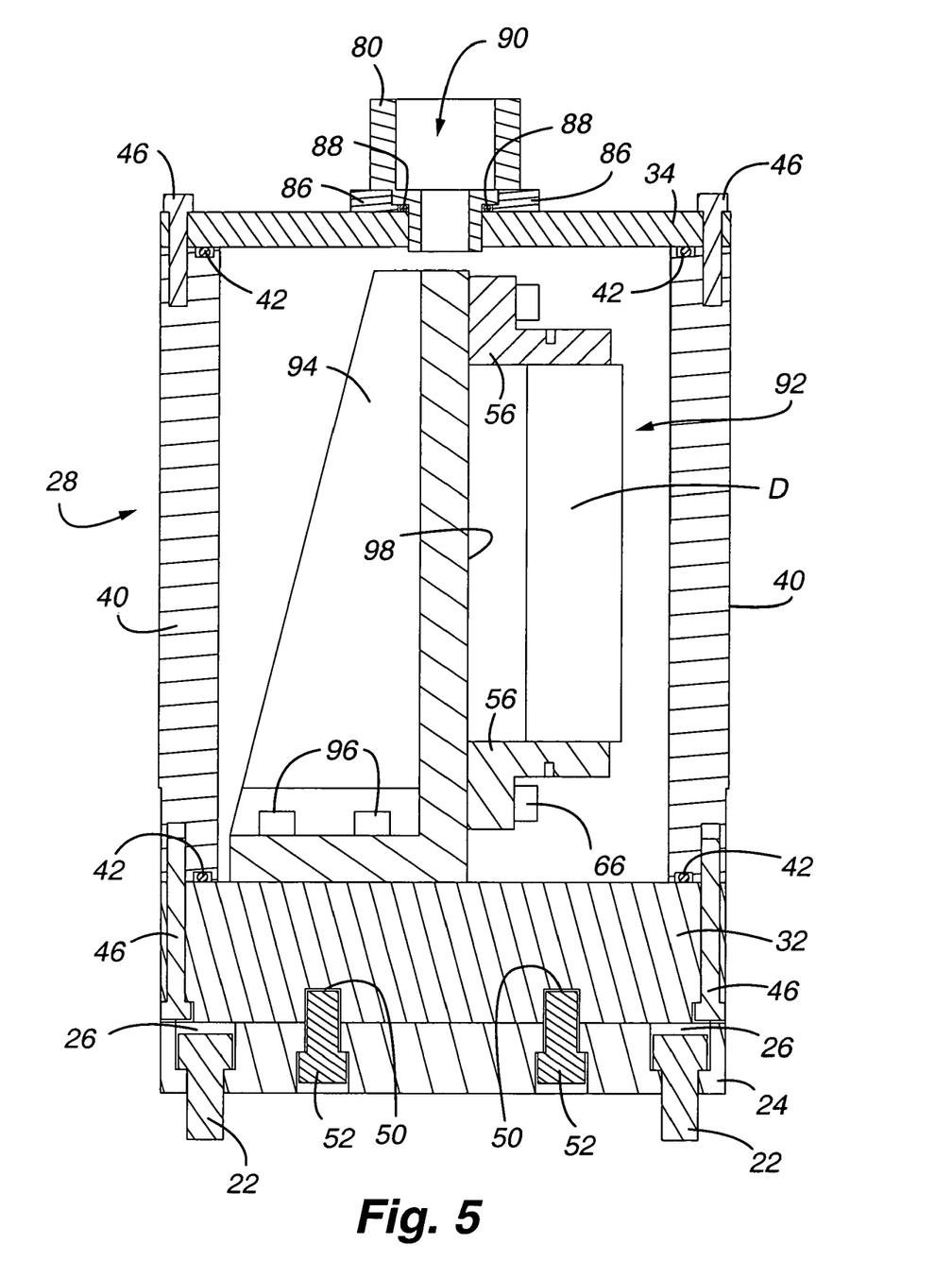
FIG. 5 is a cross-section of the device shown in FIG. 4, with the low-density gas-filled drive mounted vertically.

It should be appreciated from FIGS. 2 and 3 that the disk drive D is mounted horizontally within the test chamber 28. FIGS. 4 and 5 illustrate a vertical orientation of the disk drive within the test chamber 28. To accomplish vertical orientation of the disk drive, a fourth disk drive mounting bracket 94 is utilized. The fourth mounting bracket 94 is secured to threaded apertures 68 in the base plate 32 by fasteners 96. The fourth mounting bracket 94 has a vertical surface 98 with an array of threaded apertures 100. The disk drive mounting brackets 56 are secured to the threaded apertures 100 by fasteners 66 to orient the disk drive parallel to the vertical surface 98.

It should also be appreciated that the threaded apertures 68 and 100 disposed on the horizontal upper surface 102 of the base plate 32 and on the vertical surface 98 of the fourth mounting bracket 94, respectively, can be formed in any pattern or location. Preferably, the location of the threaded apertures is pre-arranged to provide optimum flexibility in orienting the disk drive for testing. With this structure, a disk drive can be oriented in ninety-degree increments with each edge or surface oriented in a desired manner. For example, the disk drive may be oriented with the cover, base plate or any of the four sides in a facedown position for optimum testing. The flexibility of this structure further permits the test chamber 28 to accommodate a wide variety of physical sizes of disk drives.

The mounting plate 12 has a full range of vertical motion along the vertical rails 14, from as little as three inches to as much as six feet. As a result, a wide range of vertical shocks can be reproduced to achieve various shock pulse amplitudes and durations. Typically, the customer who is purchasing the disk drive identifies the type of shock the disk drive must withstand. For example, a customer may require a disk drive to survive a particular force over some time period, such as 200 g's for one-half of a millisecond. In such a situation, the weight of the disk drive and test fixture determines the height of the drop necessary to produce the desired amplitude of the shock pulse. Additionally, the test apparatus 10 permits a variety of different ways to physically stop the free fall of the mounting plate 12 which will affect the shock received by the disk drive and thereby produce the desired pulse width duration of the shock. For example, a physical stop may be placed in the path of the mounting plate 12 to stop its free fall. The physical characteristics of the stop will determine the specific shock pulse duration experienced by the disk drive. For example, the stop may be constructed from hard or soft rubber, paper, plastic or metal. The shape of stop used will also vary the type of shock that is induced into the disk drive. For example, the stop may be flat, have a rounded or spherical cord shape, it may be frusto-conical, or have some other particular shape. Active damping used in conjunction with a specific stop will also assist with determining the resultant shock event.

An example of a vertical drop or shock apparatus is a Model 15 Shock Test Machine, sold by Lansmont Corporation of Monterey, Calif. In one embodiment, the mounting plate 12 is attached to a pulley system by chains or other cabling (not shown) to permit the mounting plate to be moved to a pre-determined height to effectuate a desired drop test. Optionally, a motor may be mounted to the top 18 to move the mounting plate to the precise height desired for testing.

The purpose of the vertical drop test is to determine helium leakage resulting from a jarring event such as a mechanical shock. The leakage can occur either as a single finite loss, sometimes called a "burp," or one that creates an opening in the drive through which all internal low-density gas escapes. To measure the loss of the low-density gas, the disk drive D is securably mounted within a hermetically sealed test chamber 28 previously described. The test chamber is securably mounted on the mounting plate 12 and a vacuum is created in the chamber. One or more shock tests are then performed on the disk drive. Should a leak occur, the leaked gas will escape from the disk drive and be detected by the gas detection device 84 (FIG. 1). The hose 82 interconnecting the gas detector device 84 and test chamber 28 is flexible and, in the preferred embodiment, is encased in a flexible metal casing. The flexibility of the hose permits the hose to maintain a seal with the test chamber 28 during the full range of its vertical movement. One example of a gas detector device is a Model MS50 Automatic Leak Detector sold by Vacuum Instrument Corporation of Ronkonkoma, N.Y.

Figure 6:
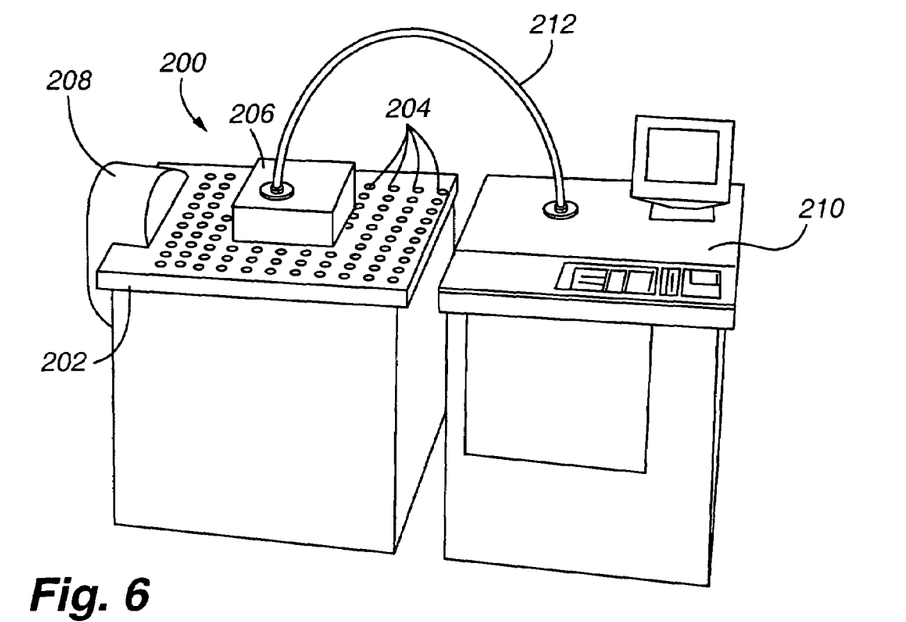
FIG. 6 is an isometric view of another embodiment of the present invention, used to vibration test a disk drive filled with low-density gas and to determine the quantity of such gas leaked from the drive due to the imparted vibration.
Figure 7:
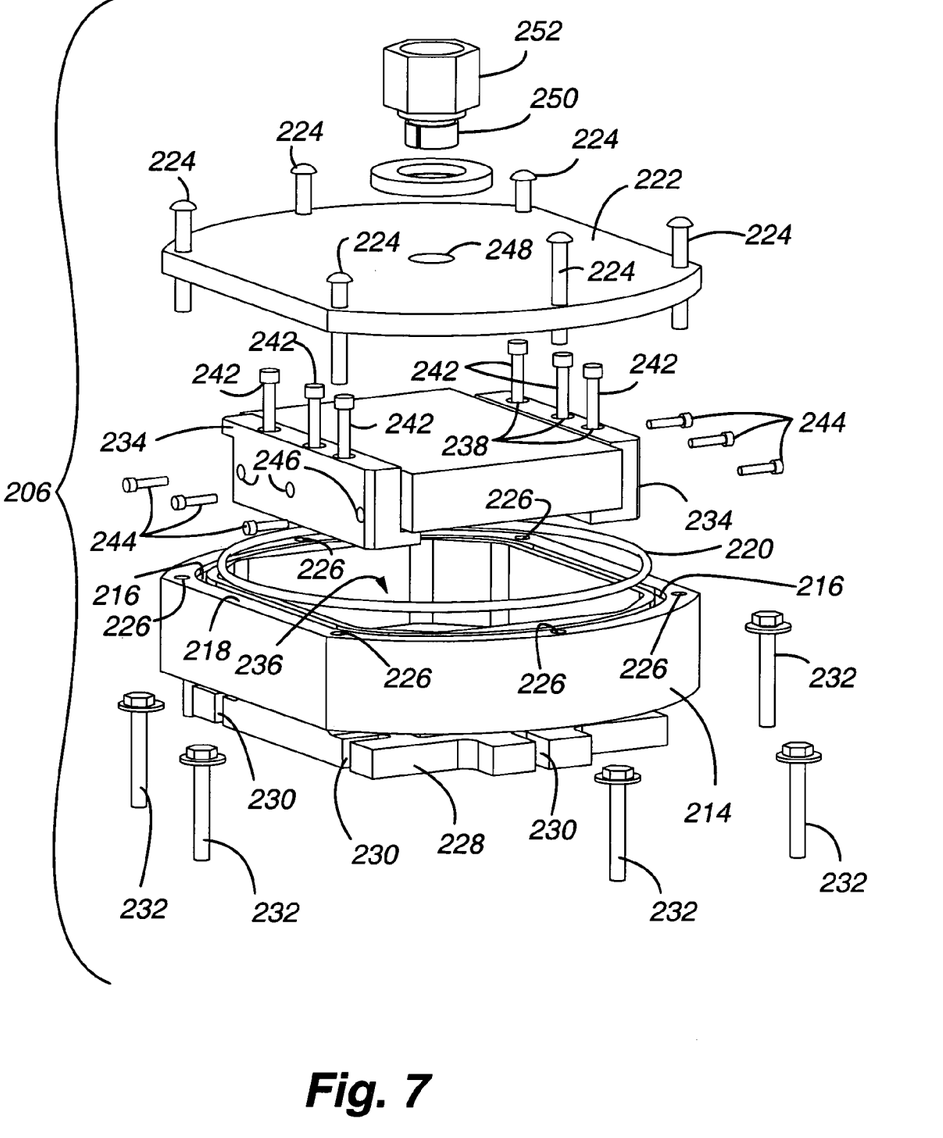
FIG. 7 is an exploded isometric view of another test chamber used to determine gas quantity leaked from a disk drive during a vibration test.
Figure 8:
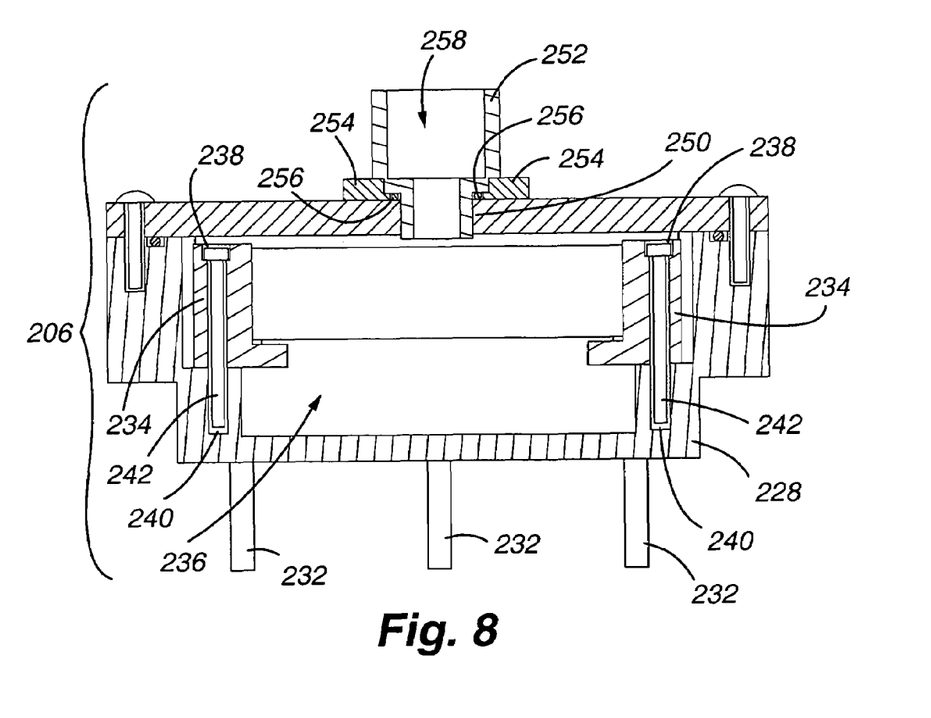
FIG. 8 is a cross-section of the device shown in FIG. 7, when assembled, further showing a low density gas-filled disk drive mounted horizontally within the test device.

Turning to FIGS. 6-8, a vibration table 200 is shown for imparting vibration-type mechanical shocks to the disk drive.

In the preferred embodiment, the vibration table is a Model ST Series sold by Unholtz-Dickie Corp. of Wallingford, Conn., and comprises a horizontal mounting bed 202 for vibration testing. The mounting bed 202 includes an array of apertures 204 for mounting a test chamber 206. The test chamber is similar to that described in association with the shock or drop test (FIGS. 1-5). The bed 202 vibrates due to the rotation of a drum 208 connected to the bed 202. The degree or strength of the vibration can be adjusted to achieve desired test frequencies and amplitudes. The test chamber 206 is connected to a gas detection device 210 by a flexible hose 212. In the preferred embodiment, the hose 212 is enclosed in a flexible metal casing or sleeve (not shown). As previously mentioned, one example of an acceptable gas detection device is a model MS50 Automatic Leak Detector sold by Vacuum Instrument Corporation of Ronkonkoma, N.Y.

The test chamber 206 is shown in FIGS. 7 and 8. The chamber comprises a main body 214 having an open top. A channel 216 is formed on the upper surface 218 of the main body 214 in which an O-ring 220 is fitted to create a seal between the top cover 222 and upper surface 218 of the main body 214. The top cover is attached to the main body by fasteners 224, which engage threaded apertures 226 in the main body.

The main body 214 is also provided with an integral mounting bracket 228 so that it may be mounted directly to the mounting bed 202. The mounting bracket has slots 230 which accept fasteners 232 for purposes of securing the test chamber to the array of apertures 204 on the mounting bed 202. The pattern of the array may be predetermined to permit a variety of orientations of the test chamber on the mounting bed 202.

If a leak is created, the disk drive will be analyzed and steps taken, if necessary, to affect design changes and/or apply corrective measures to prevent recurrence of the leak on subsequent tests.

Drive mounts 234 are utilized to position and hold the drive D in a horizontal orientation within internal chamber 236 of the main body 214. The test fixture designed for the vertical shock test, shown in FIGS. 2-5, can be secured to the Unholtz-Dickie Model ST Series vibration table to provide both horizontal and vertical mounting arrangements. During vibration tests both horizontal and vertical orientations are necessary. The horizontal limitations of the above detailed embodiment are because it was originally designed to mount to a smaller Unholtz-Dickie Model HX Series vibration table that could not accommodate the mass of a larger fixture. However, its compact and lightweight magnesium design provides opportunities for it to be used on vibration tables having weight limitations. The drive mounts 234 have openings 238 that are aligned with threaded apertures 240 in the main body. Fasteners 242 secure the drive mounts to the main body. The drive mounts 234, in turn, are connected to the disk drive D by fasteners 244 that extend through apertures 246 in the drive mounts into threaded apertures in the housing of the disk drive (not shown).

The top cover 222 includes a threaded aperture 248 to receive the threaded male end 250 of a coupling 252. A washer 254 and O-ring 256 are positioned between the coupling 252 and top cover 222 to form a hermetic seal. The coupling has an internal passageway 258 that allows the interior 236 of the test chamber to be in fluid communication with the gas detection device 210 via the flexible hose 212.

In operation, the test chamber 206 and disk drive D are subjected to one or more vibration tests. These tests may be unique to the disk drive manufacturers or required by the disk drive industry. If a leak occurs, it will be detected and quantified by the gas detection device 210. The location of the leak can be determined and steps taken to prevent recurrence of the leak.

In order for leak detection methodology to be accurate and reliable, the present invention further includes a method and apparatus for calibrating the leak detection equipment. While the volume of low density gas within a sealed disk drive may be calculated, it is difficult to ascertain small amounts of gas leaked in a finite leak situation, such as measured by the previously addressed test devices. Accordingly, a test device illustrated in FIGS. 9-11 has been developed to address this situation. This apparatus or test well assembly 300 is designed for use in connection with the vertical drop test apparatus of FIG. 1. The test well assembly 300 comprises a test well 302 having an open central cavity 304. The test well 302 is mounted to a horizontal mounting bracket 306 by fasteners 308. The horizontal mounting bracket, in turn, is connected to the base 32 of the chamber 28 used in the vertical drop test by fasteners 310.

Figure 9:
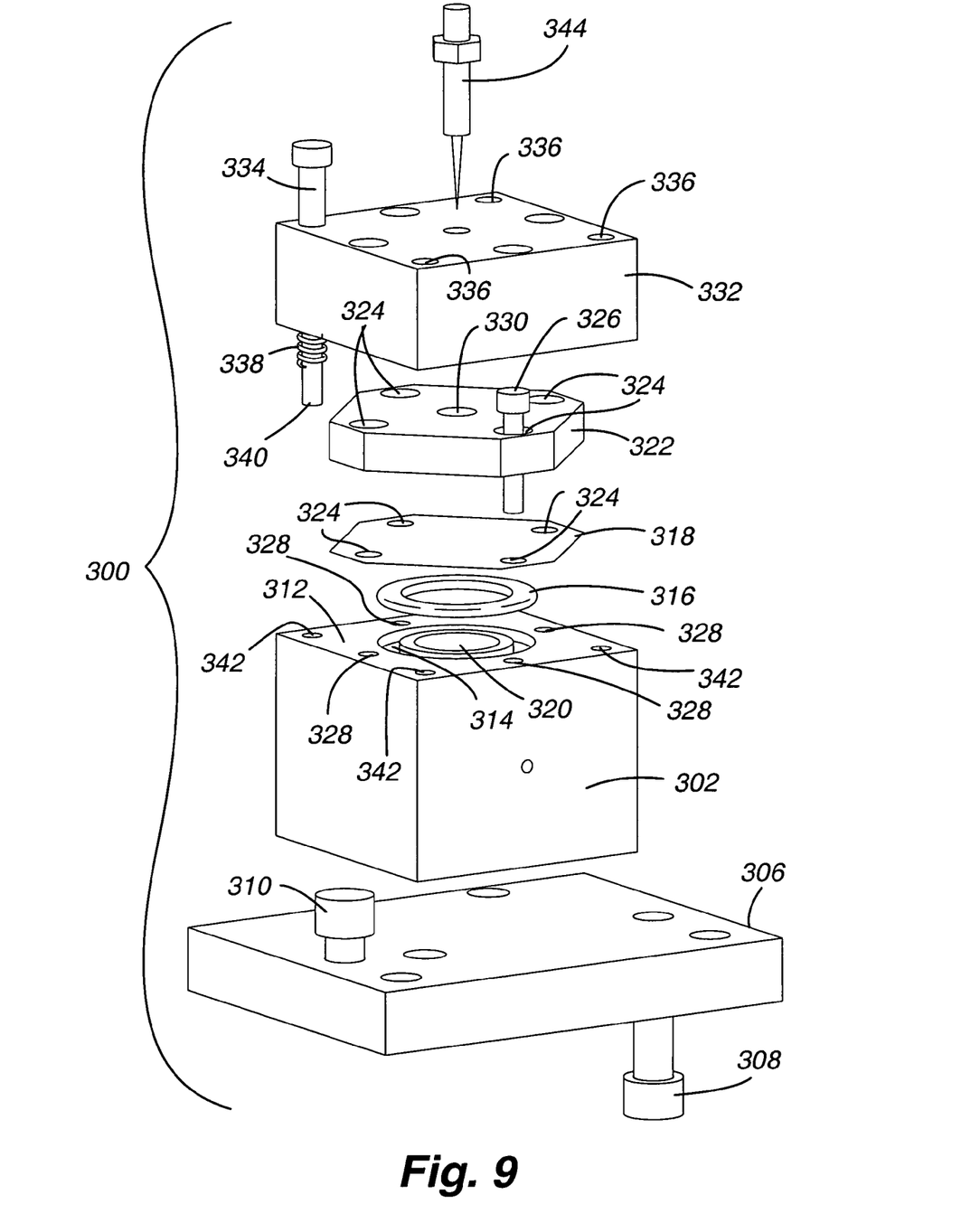
FIG. 9 is an exploded isometric view of another embodiment of the present invention, used to test and calibrate the accuracy of the gas detection devices used in shock and vibration testing.
Figure 10:
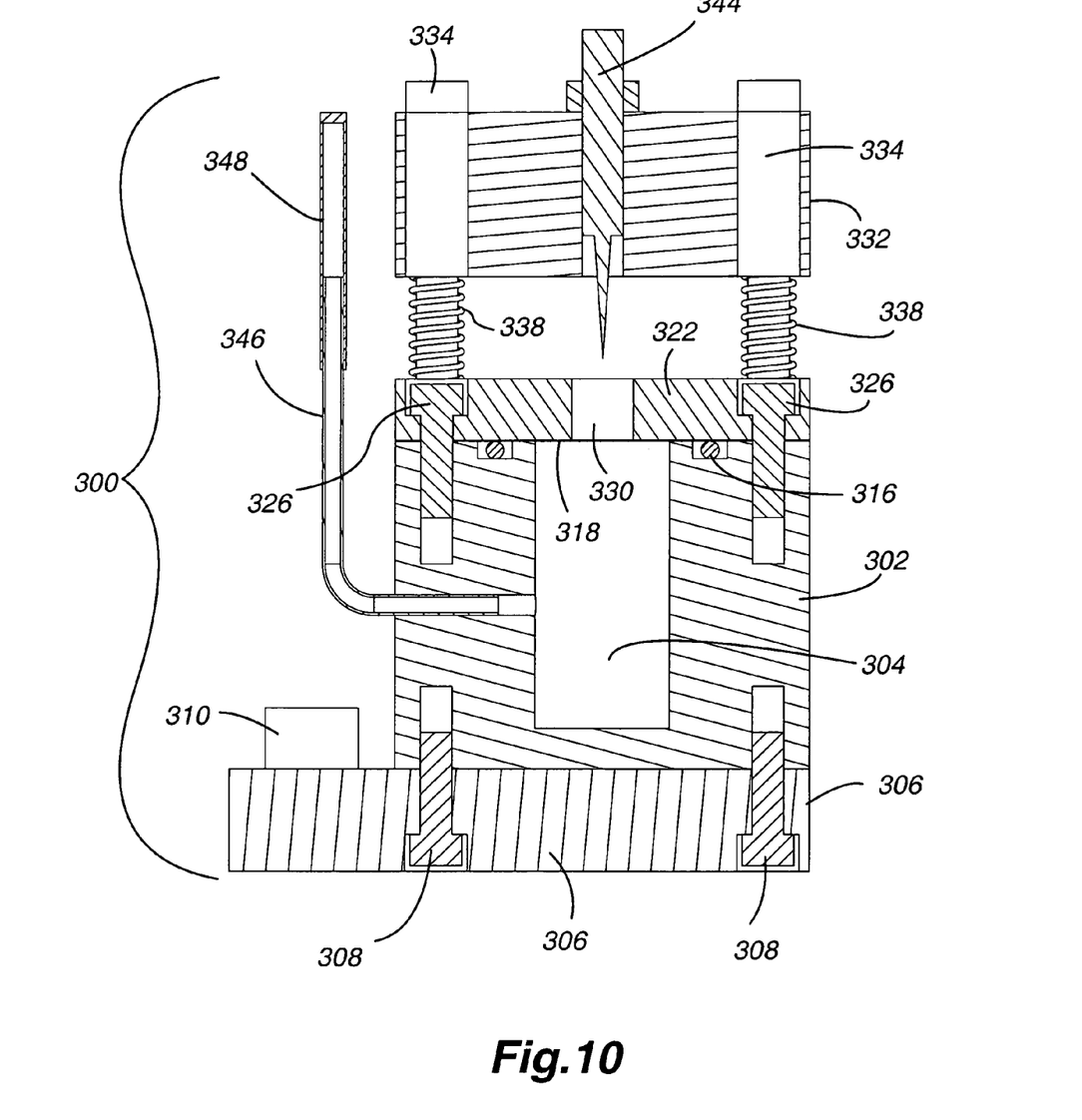
FIG. 10 is a cross-section of the device shown in FIG. 9, when assembled, further showing the assembly used to test and calibrate the accuracy of the gas detection devices used in shock and vibration testing.

The top surface 312 of the test well 302 includes a channel 314 to receive an O-ring 316. A thin metal sheet or membrane 318 is positioned over the opening 320 of the test well and a cover 322 is positioned over the membrane to securely hold the membrane in place over the opening 318. The cover 322 and membrane 318 have aligned apertures 324 to receive fasteners 326. The fasteners 326 secure the cover 322 and membrane 318 to threaded apertures 328 in the top of the test well. The cover 322 also includes a central opening 330, which leaves a portion of the membrane 318 exposed.

An anvil 332 is positioned above and spaced from the top cover 322. Four shoulder bolts 334 extend through four corner apertures 336 in the anvil and each has a coil spring 338 positioned around the post which maintains the spacing between the anvil and cover. The distal ends 340 of the posts are threaded and are secured in four threaded corner apertures 342 in the test well. A puncture pin 344 is secured to the anvil and is aligned over the opening 330 in the top cover 322.

Figure 11:
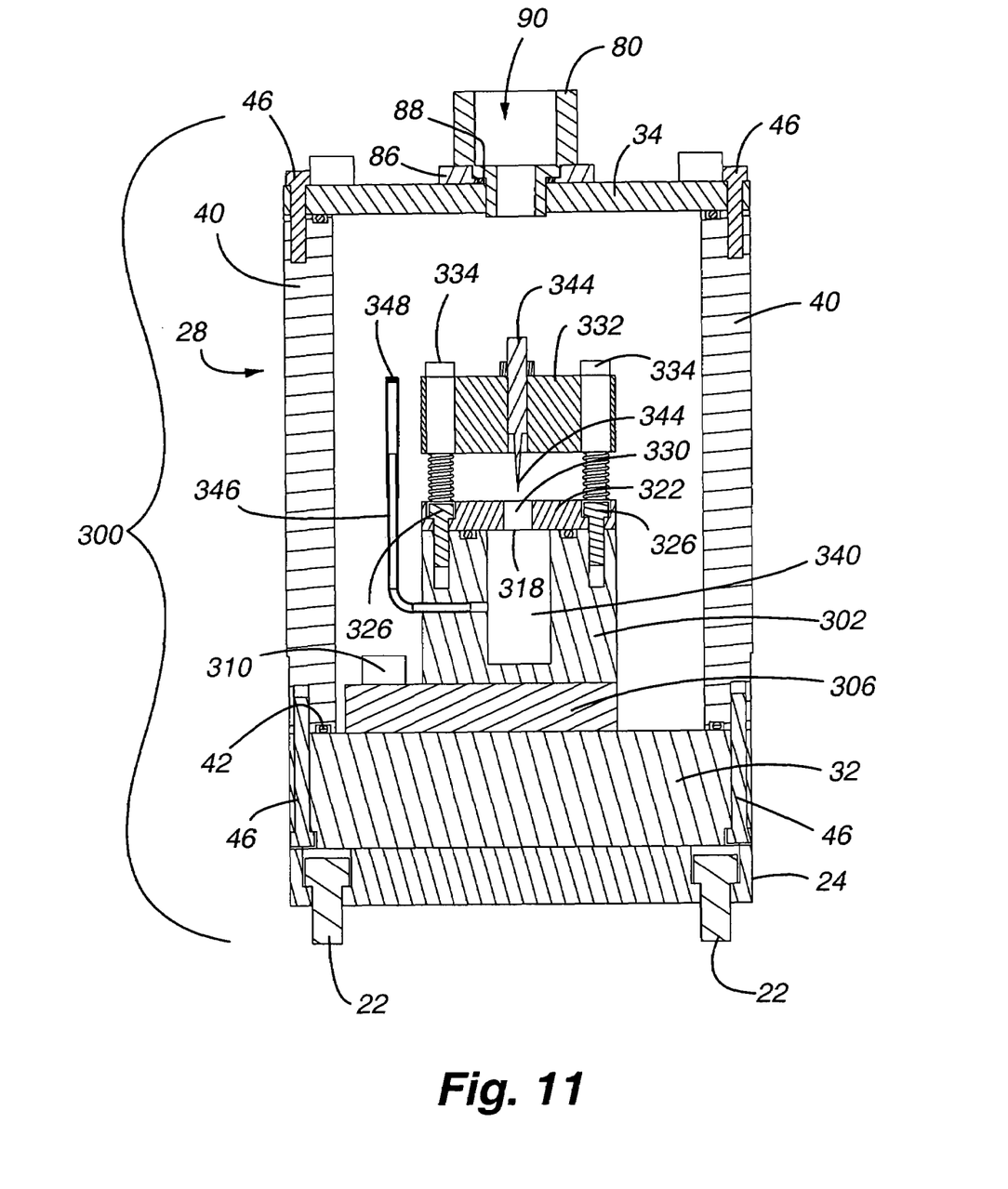
FIG. 11 is a cross-sectional view of the test chamber of FIG. 3 with the device shown in FIG. 10 mounted.

As illustrated in FIGS. 10 and 11, the test well assembly 300 also includes a gas fill pipe 346 and pipe cap 348 positioned in the sidewall. Once the cover is in place and the membrane or diaphragm is positioned over the opening in the test well, the inner cavity 304 is filled with a known quantity of gas. A thin diaphragm such as stainless steel shim stock of 0.0015 inches in thickness is positioned between the test well and the cover.

In operation, the test well assembly 300 is dropped in the vertical drop test such that the springs 338 compress under the inertial mass of the anvil 332 and the pin 344 punctures the diaphragm to release the helium or low density gas from the test well. The detection apparatus is connected to the test well under vacuum such that upon puncture of the diaphragm, all of the helium from the test well is evacuated from the test well and sensed by the gas detection apparatus. Using the ideal gas law, $PV=nRT$, and the known volume of the test well, the amount of helium can be calculated. In this equation, P equals the pressure, V equals the volume of the test well, n equals the number of moles of low-density gas in the test well, R is the universal gas constant ($R=8.3145$ Joules/mol K) and T equals absolute temperature. By plotting the gas leak over time and taking the integral of that generated curve, the volume of helium leaked into the test chamber can be detected and compared to the known volume from the test well. In this manner, the test equipment can be regularly calibrated and the tests conducted with the vertical drop apparatus and horizontal vibration test can provide accurate and reliable information for purposes of manufacturing disk drives.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   providing a data storage device comprising a housing filled with a low-density gas;
   placing the data storage device in a test chamber;
   subjecting the test chamber and the data storage device to a mechanical shock by vibrating the test chamber and the data storage device; and
   detecting for a presence of said low-density gas within the test chamber in response to the vibrating step.

2. The method of claim 1, wherein the placing step comprises securing the data storage device in a horizontal orientation.

3. The method of claim 1, wherein the placing step comprises securing the data storage device in a vertical orientation.

4. The method of claim 1, further comprising creating a vacuum in an interior of the test chamber after the placing step and prior to the vibrating step.

5. The method of claim 1, wherein the detecting step comprises using a mass spectrometer.

6. The method of claim 1, further comprising positioning a fluid conduit between the test chamber and a low-density gas detection device such that the low-density detection device is in fluidic communication with an interior of the test chamber.

7. The method of claim 6, wherein the gas detection device is a mass spectrometer.

8. The method of claim 6, wherein said conduit is flexible.

9. The method of claim 1, wherein the low-density gas is an inert gas.

10. The method of claim 9, wherein the low-density gas is helium.

11. The method of claim 1, further comprising altering manufacturing methods associated with the data storage device based upon said measuring for the presence of said low-density gas within the test chamber.

12. The method of claim 1, further comprising a prior step of assembling the data storage device housing by securing a cover to a base plate to form an interior chamber and filling the interior chamber with the low-density gas.

13. The method of claim 12, wherein the data storage device further comprises a magnetic storage disk mounted within the interior chamber.

14. The method of claim 1, wherein the subjecting step comprises mounting the test chamber and the data storage device to a vibration table and using the vibration table to impart vibration of at least one selected frequency to the test chamber and the data storage device.

15. A method, comprising:
   placing a data storage device filled with a low-density gas in a test chamber substantially void of the low-density gas;
   subjecting the test chamber and the data storage device to a mechanical shock by vibrating the test chamber and the data storage device; and
   detecting for presence of the low-density gas within the test chamber in response to the vibrating step.

16. The method of claim 15, wherein the low-density gas comprises helium.

17. The method of claim 15, wherein the placing step comprises placing the data storage device into an air atmosphere in the test chamber.

18. The method of claim 17 wherein the placing step further comprises applying a vacuum suction to the test chamber to remove a substantial portion of the air atmosphere from said chamber.

19. The method of claim 15, wherein the method further comprises positioning a fluid conduit between the test chamber and a low-density gas detection device such that the low-density detection device is in fluidic communication with an interior of the test chamber.

20. The method of claim 15, wherein the subjecting step comprises mounting the test chamber and the data storage device to a vibration table, and using the vibration table to impart vibration of at least one selected frequency to the test chamber and the data storage device.

* * * * *